United States Patent
Kim et al.

(10) Patent No.: US 10,013,073 B2
(45) Date of Patent: Jul. 3, 2018

(54) ROTARY INPUT DEVICE AND ELECTRONIC DEVICE ADOPTING THE SAME

(71) Applicant: Samsung Electronics Co., Ltd., Gyeonggi-do (KR)

(72) Inventors: Sang-Eun Kim, Seoul (KR); Ki-Young Kwon, Gyeonggi-do (KR); Kyung-Hwan Kim, Gyeonggi-do (KR); Ji-Hoon Park, Gyeonggi-do (KR); Tae-Yoon An, Gyeonggi-do (KR); Tae-Won Um, Seoul (KR); In-Ho Oh, Gyeonggi-do (KR); Jae-Woong Choi, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 135 days.

(21) Appl. No.: 15/145,914

(22) Filed: May 4, 2016

(65) Prior Publication Data

US 2016/0327916 A1    Nov. 10, 2016

(30) Foreign Application Priority Data

May 7, 2015  (KR) .......................... 10-2015-0063969

(51) Int. Cl.
| | |
|---|---|
| *G06F 3/02* | (2006.01) |
| *G06F 3/0362* | (2013.01) |
| *G04C 3/00* | (2006.01) |
| *G06F 1/16* | (2006.01) |

(52) U.S. Cl.
CPC ............... *G06F 3/02* (2013.01); *G04C 3/005* (2013.01); *G06F 1/163* (2013.01); *G06F 3/0362* (2013.01)

(58) Field of Classification Search
CPC ............................. G04C 3/005; G06F 3/0362
See application file for complete search history.

(56) References Cited

U.S. PATENT DOCUMENTS

| | | | |
|---|---|---|---|
| 4,678,344 A | 7/1987 | Inoue | |
| 6,575,618 B1 * | 6/2003 | Inoue | ................... G01D 5/2451 250/231.13 |
| 9,760,064 B2 * | 9/2017 | Kim | ........................ G04G 21/00 |
| 2014/0273543 A1 | 9/2014 | Hanshew | |

FOREIGN PATENT DOCUMENTS

| | | |
|---|---|---|
| JP | 6-48299 B2 | 6/1994 |
| JP | 2003-288820 A | 10/2003 |

* cited by examiner

*Primary Examiner* — Edwin A. Leon
*Assistant Examiner* — Jason Collins
(74) *Attorney, Agent, or Firm* — Cha & Reiter, LLC (57) ABSTRACT

A rotary input device comprising: a bezel portion that includes one or more pressing members; and one or more switch units, wherein each of the switch units is arranged to come in physical contact with any of the pressing members when the bezel portion is rotated, and generate an electrical on/off signal when the switch unit comes in physical contact with any of the pressing members.

15 Claims, 10 Drawing Sheets

ROTARY INPUT DEVICE AND ELECTRONIC DEVICE ADOPTING THE SAME

CLAIM OF PRIORITY

This application claims the priority under 35 U.S.C. § 119(a) to Korean Application Serial No. 10-2015-0063969, which was filed in the Korean Intellectual Property Office on May 7, 2015, the entire content of which is hereby incorporated by reference.

TECHNICAL FIELD

The present disclosure relates to electronic devices, in general, and more particularly to an apparatus for recognizing rotation and electronic device adopting the same.

BACKGROUND

Typically, electronic devices refer to devices that perform a specific function according to installed programs, such as electronic organizers, portable multimedia players, mobile communication terminals, tablet PCs, video/audio devices, desktop/laptop computers, or car navigation units, as well as home appliances. For example, such electronic devices may output stored information in sounds or images. With the high integration of the electronic device and the propagation of high-speed and high-capacity wireless communication, in recent years, an entertainment function (such as games), a multimedia function (such as the reproduction of music/videos), a communication and security function for the mobile banking, or a function of a scheduler or an electronic wallet have been integrated into a single electronic device.

In addition, various types of wearable electronic devices have been introduced, which can be worn on the body to then be used, such as glasses or watches.

These electronic devices may be provided with rotary input device in various forms. The rotary input device may be provided in order to: turn on the electronic device in the power-off mode; execute the electronic device in the sleep mode in which the power is supplied; or execute functions of the electronic device to allow the electronic device to receive inputs in the driving mode.

The rotary input device may include a physical rotary input device that implements the input, for example, by pressing button keys, and a touch rotary input device that implements the input through a touch or the proximity. In addition, since the user cannot recognize the input by the sense of touch in the case of making an input in the touch rotary input device, a haptic device may be further provided in order to provide the user with a similar sense as the conventional physical rotary input device with respect to the user's touch.

Furthermore, the wearable device, such as a smart watch, has a limit in mounting the rotary input device due to its miniaturization. That is, a space for mounting the physical rotary input device is too small, and even if the rotary input device is mounted therein, the wearable device has a limit in implementing various types of inputs because it is extremely small.

In addition, the wearable device, such as a smart watch, may include a bezel portion that rotates in the circumferential portion of a display (hereinafter, referred to as a "bezel area") that is provided in a body of the smart watch, and a sensor unit that recognizes the rotation of the bezel portion so that the sensor unit recognizes the rotation of the bezel portion in order to thereby implement the input.

However, when the input is implemented through the rotation recognition by the sensor as described above, a separate mechanical structure is utilized: to detect the rotation of the bezel portion, separately from the sensor unit; or to provide tactile feedback in order for the sensor unit to sense the input implemented by the rotation of the bezel portion.

In addition, an additional circuit or mechanical circuit structure is utilized in order for the sensor unit to recognize the rotation of the bezel portion.

In addition, when the sensor unit is a magnetic sensor, a metal material, which may cause the generation of a signal in the magnetic sensor, cannot be used for the bezel portion or the electronic device in consideration of the characteristics of the magnetic sensor.

Furthermore, when the sensor unit is an optical sensor, the reflectivity of a light incident on the optical sensor is utilized to be altered in order to recognize the rotation of the bezel portion. To this end, a separate plate or additional operation may be added for making the reflectivity of a light different in the bezel portion.

SUMMARY

According to aspects of the disclosure, a rotary input device including: a bezel portion that includes one or more pressing members; and one or more switch units, wherein each of the switch units is arranged to come in physical contact with any of the pressing members when the bezel portion is rotated, and generate an electrical on/off signal when the switch unit comes in physical contact with any of the pressing members.

According to aspects of the disclosure, any of the switching units may include a housing; a pin portion that is provided in the housing; a ball unit that is positioned above the pin portion; and a shielding unit that is disposed between the ball unit and the housing, the shielding unit being arranged to press the pin portion when the switch unit comes in physical contact with any of the pressing members, and seal a gap between the housing and the ball unit.

BRIEF DESCRIPTION OF THE DRAWINGS

The above and other aspects and functions of the present disclosure will be more apparent from the following detailed description taken in conjunction with the accompanying drawings, in which.

DETAILED DESCRIPTION

The present disclosure may be variously modified and may have various embodiments, and some embodiments thereof will be described further below with reference to the accompanying drawings. However, it should be understood that the present disclosure is not limited to the specific embodiments, but the present disclosure includes all modifications, equivalents, and alternatives within the present disclosure.

Although ordinal terms such as "first" and "second" may be used to describe various elements, these elements are not limited by the terms. The terms are used merely for the purpose to distinguish an element from the other elements. For example, a first element could be termed a second element, and similarly, a second element could be also termed a first element without departing from the present disclosure. As used herein, the term "and/or" includes any and all combinations of one or more associated items.

Further, the relative terms "a front surface", "a rear surface", "a top surface", "a bottom surface", and the like which are described with respect to the orientation in the drawings may be replaced by ordinal numbers such as first and second.

In the present disclosure, the terms are used to describe specific embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification.

In the present disclosure, an electronic device may be a random device, and the electronic device may be called a terminal, a portable terminal, a mobile terminal, a communication terminal, a portable communication terminal, a portable mobile terminal, a display device or the like.

For example, the electronic device may be a smartphone, a portable phone, a game player, a TV, a display unit, a heads-up display unit for a vehicle, a notebook computer, a laptop computer, a tablet Personal Computer (PC), a Personal Media Player (PMP), a Personal Digital Assistants (PDA), and the like. The electronic device may be include a portable communication terminal which has a wireless communication function and a pocket size. Further, the electronic device may be a flexible device or a flexible display device.

Further, the electronic device may be a wearable device that can be worn on the body, and the wearable device may be linked with an electronic device such as a smartphone.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a Local Area Network (LAN), a Wireless Local Area Network (WLAN), a Wide Area Network (WAN), an Internet, a Small Area Network (SAN) or the like, but is not limited thereto.

Figure 1:
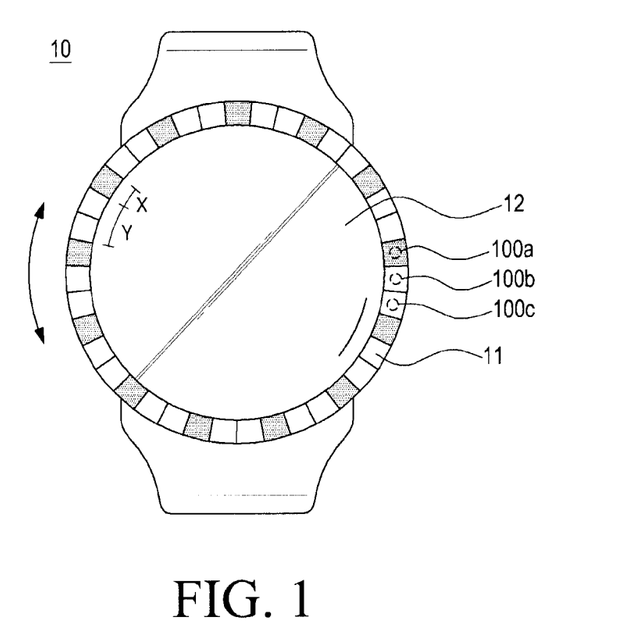
FIG. 1 is a diagram of an example of an electronic device, according to various embodiments of the present disclosure.
Figure 2:
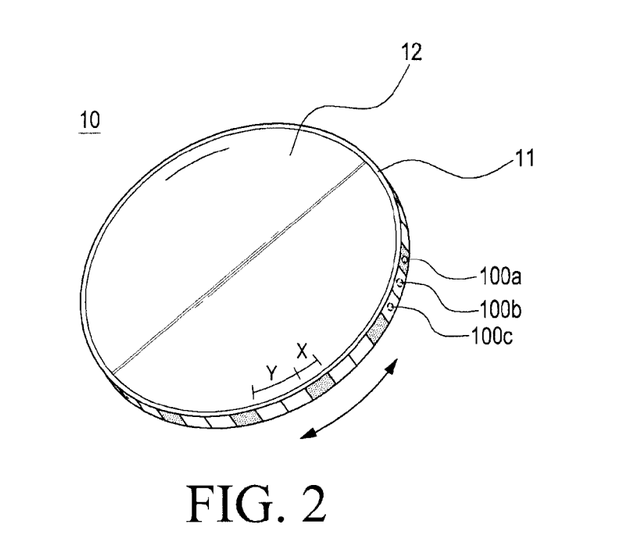
FIG. 2 is a diagram of an example of a rotary input device, according to various embodiments of the present disclosure.
Figure 3:
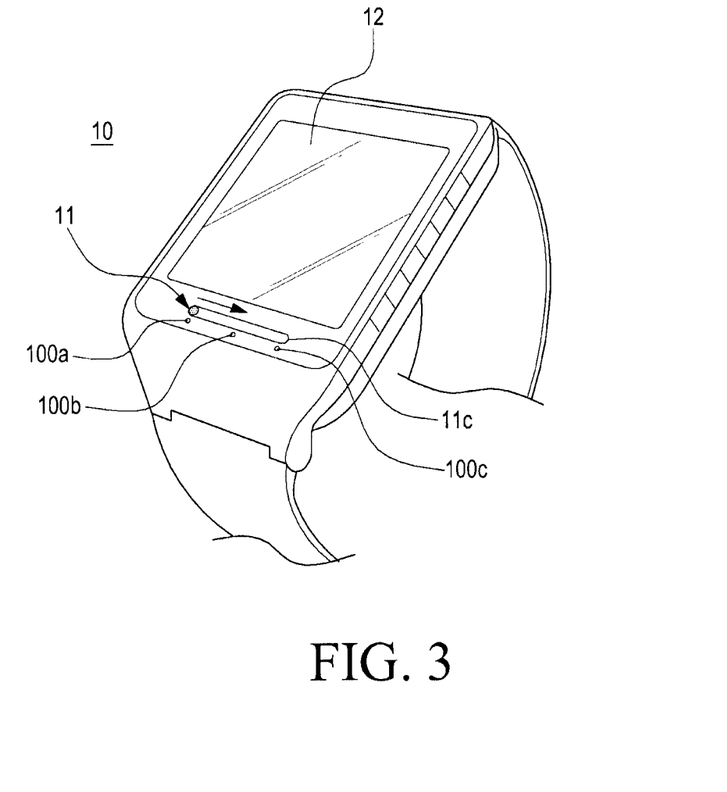
FIG. 3 is a diagram of an example of an electronic device, according to various embodiments of the present disclosure.
Figure 4:
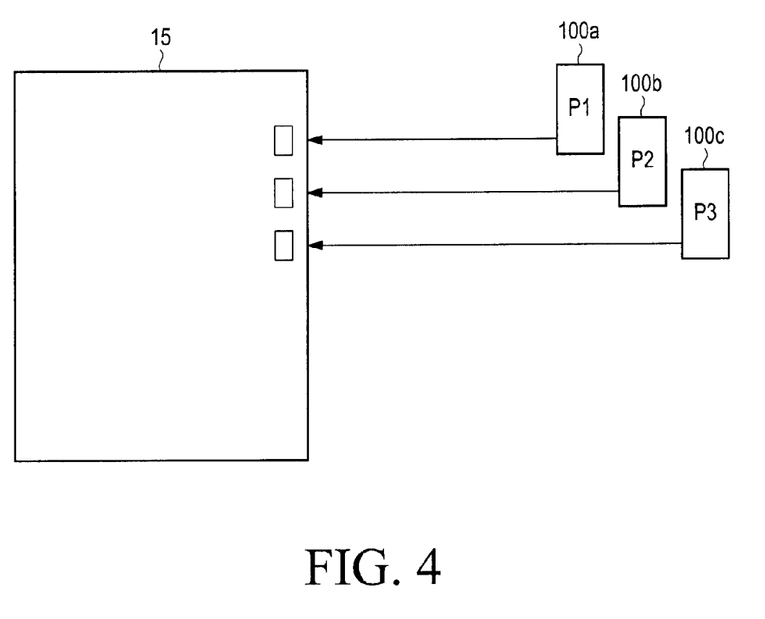
FIG. 4 is a diagram of an example of a control unit and a switch unit, according to various embodiments of the present disclosure.

FIG. 1 illustrates an electronic device 10 that includes a rotary input device 11 and 100, according to various embodiments of the present disclosure. FIG. 2 illustrates another example of a rotary input device that can be used in the electronic device 10, according to various embodiments of the present disclosure. FIG. 3 is a diagram of another example of an electronic device, according to various embodiments of the present disclosure. FIG. 4 is a diagram of an example of a control unit 15 and a switch unit 100 in the electronic device 10, according to various embodiments of the present disclosure.

Figure 5:
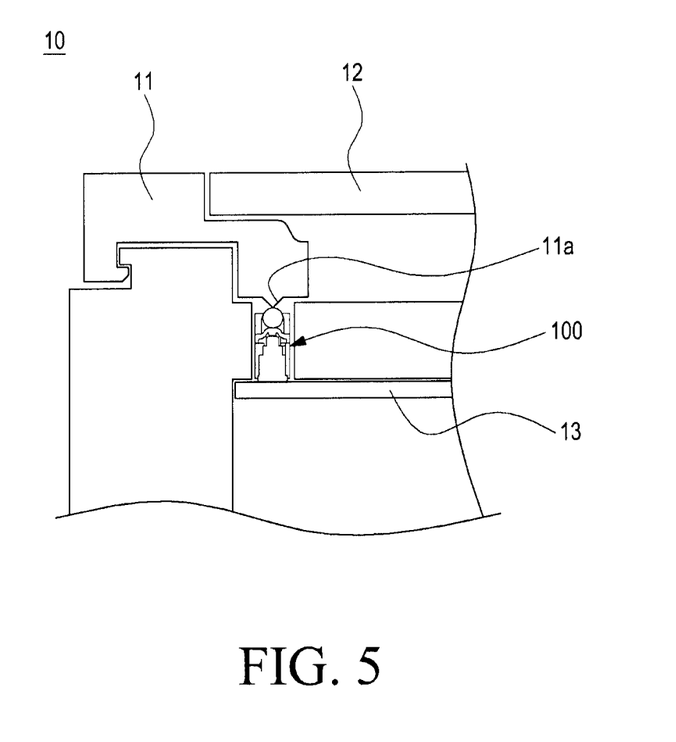
FIG. 5 is a sectional view of an example of an electronic device, according to various embodiments of the present disclosure.
Figure 6:
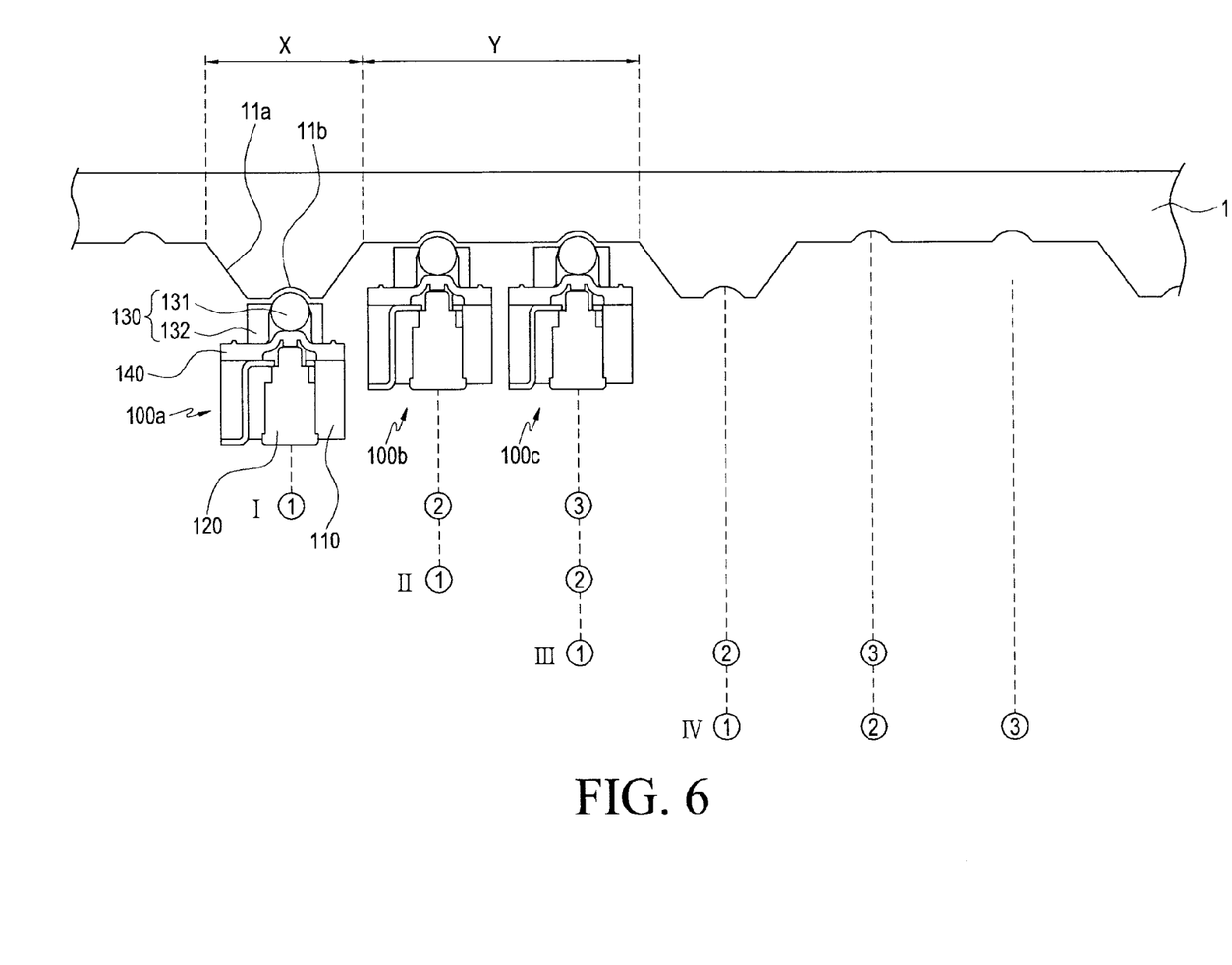
FIG. 6 is a sectional view of an example of an electronic device, according to various embodiments of the present disclosure.

Referring to FIG. 1 to FIG. 4, the rotary input device 11 and 100, according to various embodiments of the present disclosure, may include the bezel portion 11 and the switch unit 100 (see FIG. 5 and FIG. 6). In addition, the rotary input device 11 and 100 may be mounted on the electronic device 10. The electronic device 10 may include a wearable electronic device (e.g., a smart watch) and/or any other suitable type of electronic device. For example, the rotary input device 11 and 100 may be provided in a smartphone or a body-wearable electronic device 10.

The watch type of wearable electronic device 10 may include the above-mentioned rotary input device 11 and 100, a body, and a control unit 15.

The body may include the display device 12.

In addition, the bezel portion 11 may be mounted on the body (specifically, on the circumference of the display device 12) to be rotatable. Although the bezel portion 11, according to the embodiment of the present disclosure, is described to rotate along the circumference of the display device 12, it is not limited thereto. Additionally or alternatively, the bezel portion 11 may move linearly in the edge area of the display device 12 as will be described further below.

The control unit 15 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. The control unit 15 may output various user interfaces (e.g., display the user interfaces on the display device 12) in accordance with electric signals that are generated as a result of the pressing or press-releasing of the switch unit 100 according to the rotation of the bezel portion 11 described later. As will be described further below, various user interfaces may be displayed according to the rotation of the bezel portion 11. For example, functions of the electronic device (such as a camera function, a biometric measurement function, or a menu display function) may be executed by the control unit 15 according to the electric signal that is applied when the first switch 100a of the switch unit 100 is turned on (e.g., closed) while the second and third switches 110b and 110c are turned off (e.g., left open).

The bezel portion 11 may rotate around the circumference of the body of the electronic device (and/or around the display device 12). The bezel portion 11 may have one or more pressing members 11a that protrude from the inner surface of the bezel portion 11 toward the switch unit 100 (see FIG. 5 and FIG. 6 as well). In addition, the bezel portion 11 may have the first area (X) that has the pressing member 11a to press the switch unit 100 according to the rotation of the bezel portion 11, and the second area (Y) that restores the pressed switch unit 100.

The embodiment of the present disclosure will show the bezel portion 11 that is shaped into a circle to conform to the circumference of the display device 12, and to be rotatable (see FIG. 1). In such instances, the pressing member 11a may protrude from the lower surface of the bezel portion 11 toward the switch unit 100. Alternatively, although it is not shown in the drawing, the pressing member may protrude from the inner surface of the bezel portion 11 to the center thereof.

However, the shape and the mounting position of the bezel portion 11 are not limited thereto. For example, as shown in FIG. 2, the bezel portion 11 may rotate around a side of the body of the electronic device. In such instances, the pressing member 11a may protrude from the inner circumference of the bezel portion 11 to the center thereof.

Alternatively, the input device depicted in FIGS. 1 and 2 may be arranged to slide linearly, rather than rotate. As shown in FIG. 3, the bezel portion 11 may have a predetermined length in the peripheral area of the display device 12. More specifically, a guide portion 11c may be provided in a peripheral area of the bezel portion 11 of the display device 12, and then the bezel portion 11 equipped with the pressing member 11a may be arranged to slide (e.g., slide linearly) in the guide portion 11c.

FIG. 5 is a sectional view of the electronic device 10, according to various embodiments of the present disclosure. FIG. 6 is a sectional view of the electronic device 10, according to various embodiments of the present disclosure.

Referring to FIG. 5 and FIG. 6, the description, according to an embodiment of the present disclosure, will be made of the pressing member 11a that protrudes downward from the inner surface of the bezel portion 11. However, as described above, the pressing member 11a may protrude from the inner circumference of bezel portion 11 to the center thereof according to the mounting position or the structure of the bezel portion 11.

A plurality of pressing members 11a, according to an embodiment of the present disclosure, may be provided on the inner surface of the bezel portion 11 to be spaced a predetermined distance from each other. The space between the pressing member 11a and the adjacent pressing member 11a may vary according to the number of switch units 100. For example, when two switch units 100 are provided, the pressing member 11a and the adjacent pressing member 11a may be positioned with a single space interposed therebetween. That is, the first area (X) and the second area (Y) may have the same length. In addition, as further discussed below, when three switch units 100 are provided, the pressing member 11a and the adjacent pressing member 11a may be positioned with two spaces interposed therebetween. That is, the second area (Y) may be formed to be double the length of the first area (X).

The pressing member 11a may press one or more of the plurality of switch units 100 that are provided on the inner surface of the bezel 11, and the three switch units 100 may be spaced a predetermined distance in order to press one of the three switch units 100, or in order to press the remaining switch units except for one in the embodiment of the present disclosure. In addition, grooves 11b may be inwardly formed on the surface of the first area (X) (specifically, on the surface of the pressing member 11a) and the surface of the second area (Y) in order to accept a ball 131 of the switch unit 100.

When the bezel portion 11 is rotated, the ball 131 of the switch unit 100, which engages with the pressing member 11a, is received in the corresponding groove 11b in order to provide the user with tactile feedback.

Figure 7:
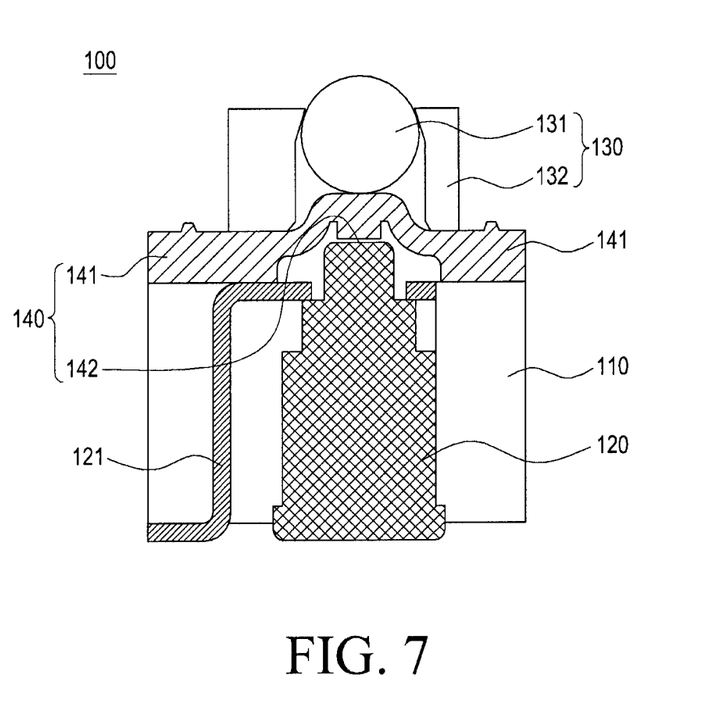
FIG. 7 is a diagram of an example of a switch unit, according to various embodiments of the present disclosure.

FIG. 7 is a diagram illustrating an example of the switch unit 100, according to various embodiments of the present disclosure.

Referring to FIG. 7, the switch unit 100 may be mounted inside the body of the electronic device. In the example of FIG. 7, three switch units 100 are provided in the electronic device 10 in order to detect the rotation of the bezel portion 11 and in order to display (or otherwise present) a user interface corresponding to electrical signals generated by at least some of the switch units 100.

One or more switch units 100 may be engaged with the pressing member 11a according to the rotation of the bezel portion 11 to then be pressed, or may be press-released. The switch unit 100 may be pressed by, or released from, the pressing member 11a according to the rotation of the bezel portion 11 in order to thereby apply or not apply an electrical signal. One or more switch units 100 may be turned on and off, so that on/off-signals may be applied to the control unit 15, and the control unit 15 may output a user interface (e.g., display a user interface on a display) according to the value of the applied electrical signals.

The switch unit 100 may include the first, the second, and the third switches 100a, 100b, and 100c that are provided to be adjacent to each other in sequence.

The second switch 100b may be positioned between the first switch 100a and the third switch 100c, and if the first switch 100a is positioned in the first area (X) to be pressed by the pressing member 11a, the second and the third switches are positioned in the second area (Y) to remain in the press-released state (see State I and State IV in FIG. 6).

The second switch 100b is positioned to be adjacent to the first switch 100a, and is pressed by alternating with the first switch 100a and the third switch 100c according to the rotation of the bezel portion 11. If the second switch 100b is positioned in the first area (X) to be pressed by the pressing member 11a, the first switch 100a and the third switch 100c may be positioned in the second area (Y) on both sides of the first area (X) to be in the press-released state (State II in FIG. 6).

The third switch 100c may be positioned to be adjacent to the second switch 100b, and may be pressed by alternating with the first switch 100a and the second switch 100b. When the third switch 100c is positioned in the first area (X) to be pressed by the pressing member 11a, the first switch 100a and the second switch 100b may be positioned in the second area (Y) to be in the press-released state (State III of FIG. 6).

In the present example, the third switch units 100a, 100b, and 100c may have the same or similar structure. According to an embodiment of the present disclosure, any of the switch units 100a, 100b, and 100c may include a housing 110, a pin portion 120, a ball unit 130, and a shielding unit 140.

The housing 110 may have a space to receive the pin portion 120 therein.

The pin portion 120 may be placed in the space of the housing 110. The pin portion 120 may be elastically pressed, and the top of the pin portion 120 may protrude toward the upper portion of the space. The top of the pin portion 120 may face a pressing portion 142 of the shielding unit 140 to be thereby elastically pressed by the pressing portion 142.

The pin portion 120 may include one or more signal pins 121. The signal pins 121 may be electrically connected, or disconnected, according to the pressing or the press-releasing of the pin portion 120 by the pressing portion 142.

The ball unit 130 may be positioned above the pin portion 120, and more specifically, may be mounted on the shielding unit 140 that covers the housing 110. The ball unit 130 may include a ball 131 and a ball housing 132. The ball 131 may come into contact with the inner surface of the rotating bezel portion 11, and may rotate during the rotation of the bezel portion 11 in order to thereby facilitate the rotation of the bezel portion 11. The ball 131 may rotate while it comes into contact with the inner surface of the bezel portion 11 according to the rotation of the bezel portion 11. When the ball 131 engages with the pressing member 11a of the first area (X) with the rotation of the bezel portion 11, the ball 131 may be received in the groove 11b that is formed on the surface of the pressing member 11a. In addition, when the ball 131 is positioned in the second area (Y) with the rotation of the bezel portion 11, the ball 131 may be received in the groove 11b that is formed on the inner surface of the bezel portion 11 of the second area (Y).

The ball 131 may rotate while being in contact with the inner surface of the bezel portion 11 of the first area (X) and the second area (Y), and may be snapped in place into the groove 11b (e.g., by the elastic pin portion 120) in order to provide tactile feedback during the rotation of the bezel portion 11. In addition, the ball 131 may be positioned on the shielding unit 140 (specifically, on the pressing portion 142) in order to thereby press the pressing portion 142 in a vertical direction according to the pressing of the ball 131.

The ball housing 132 is provided to enclose the ball 131 while a top portion of the ball 131 is exposed through the upper portion thereof in order to thereby prevent the ball 131 from escaping the ball housing 132. In addition, the ball housing 132 may be placed on the shielding unit 140 to come into contact with the same.

The shielding unit 140 may be provided between the ball unit 130 and the housing 110 to seal the gap between them in order to thereby prevent foreign substances from entering the housing 110 (specifically, into the space where the pin portion 120 is placed)

The shielding unit 140 may press the pin portion 120 according to the pressing of the ball unit 130 in order to allow the pin portion 120 to switch between the on state and the off state. The shielding unit 140 may include a sealing plate 141 and the pressing portion 142. The sealing plate 141 may be provided between the housing 110 and the ball housing 132, and more specifically, may cover the housing 110 to seal the same. The pressing portion 142 may be provided on one side of the sealing plate 141 (specifically, on the lower surface of the sealing plate 141) while the upper portion of the pressing portion 142 comes into contact with the ball 131 and the lower portion of the pressing portion 142 protrudes toward the pin portion 120. When the ball 131 is positioned in the first area (X) and the second area (Y) according to the rotation of the bezel portion 11, the pressing portion 142 may be pressed by the pressing member 11a of the first area (X) in order to thereby press the pin portion 120, or may be restored to the released state in the second area (Y). The shielding unit 140 may be made of at least one of silicone, urethane, or rubber.

As described above, when the ball unit 130 is pressed by the pressing member 11a, a sense of a rotation grip of the bezel portion 11 may be provided, and the pin portion 120 may be elastically pressed to be electrically connected or may be released in order to thereby generate the on or off signal.

Figures 8, 9:
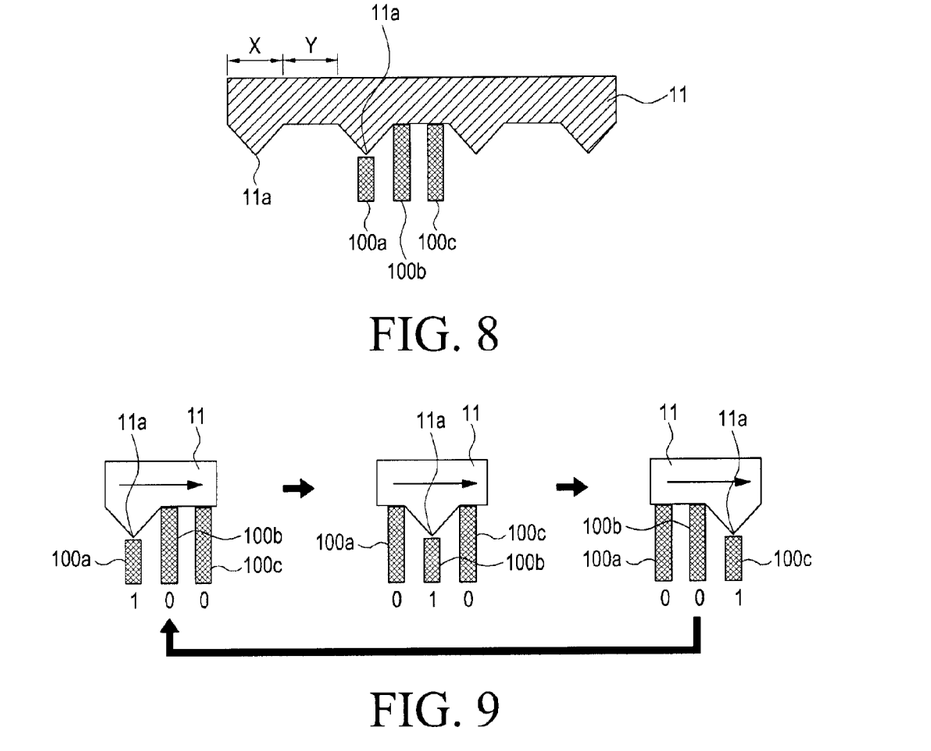
FIG. 8 is a diagram illustrating an example of a switch unit being pressed, according to various embodiments of the present disclosure.
FIG. 9 is a diagram illustrating an example of a rotary input device being rotated in a clockwise direction, according to various embodiments of the present disclosure.
Figure 10:
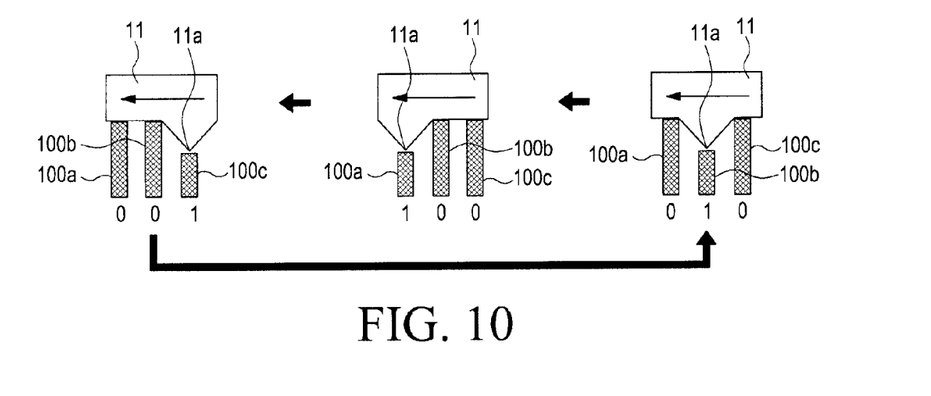
FIG. 10 is a diagram illustrating an example of a rotary input device being rotated in a counterclockwise direction, according to various embodiments of the present disclosure.
Figure 11:
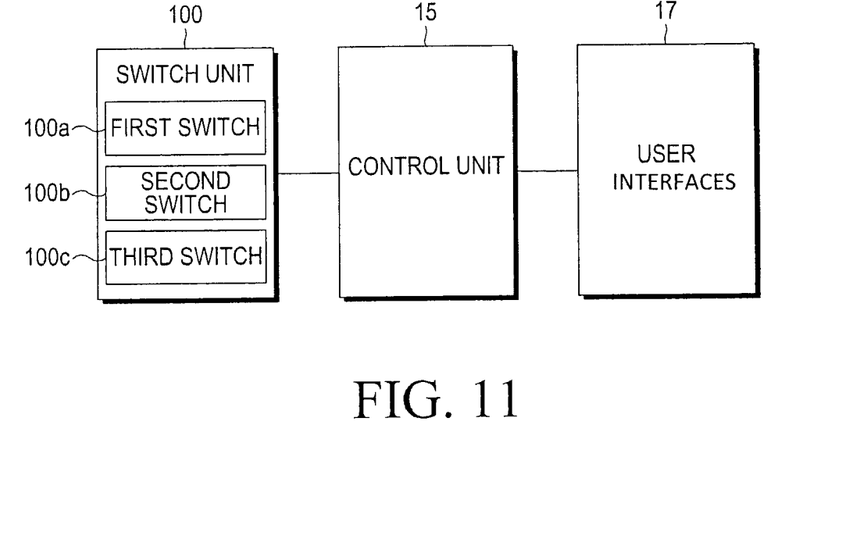
FIG. 11 is a diagram illustrating the operation of an electronic device including the rotary input device of FIGS. 9 and 10, according to various embodiments of the present disclosure.

FIG. 8 is a diagram illustrating an example of a switch unit 100 being pressed, according to various embodiments of the present disclosure. FIG. 9 is a diagram illustrating an example of the rotary input device 11 and 100 being rotated in a clockwise direction, according to various embodiments of the present disclosure FIG. 10 is a diagram illustrating an example of the rotary input device 11 and 100 being rotated in a counterclockwise direction, according to various embodiments of the present disclosure. FIG. 11 is a diagram illustrating the operation of an electronic device including the rotary input device of FIGS. 9 and 10, according to various embodiments of the present disclosure.

Referring to FIG. 8 to FIG. 11, as described above, the first, the second, and the third switches 100a, 100b, and 100c, which are mounted adjacently to each other, may be sequentially pressed by the pressing member 11a according to at least one of the clockwise rotation or the counterclockwise rotation of the bezel portion 11 in order to thereby generate unique electric signal values, respectively. The control unit 15 may receive the unique electric signal values according to the pressing of the first, the second, and the third switches 100a, 100b, and 100c in order to thereby recognize the rotational direction and in order to execute a different user interface depending on the electric signal values.

For example, FIG. 9 shows that the bezel portion 11 rotates in the clockwise direction. The state in which the electrical signal is provided to the switch unit 100 is expressed as "1," and the state in which the electrical signal is not provided to the switch unit 100 is expressed as "0."

First, the operation of recognizing the clockwise rotation of the bezel portion 11 will be described with reference to FIG. 9 or FIG. 11.

When the first switch 100a engages with the pressing member 11a and the second and the third switches remain in the second area (Y) according to the rotation of the bezel portion 11, the first switch 100a may generate an electric signal of a value "1," while the second and the third switches 100b and 100c do not generate the electric signals to then have a signal value of "0." Accordingly, when the first switch 100a is pressed and the second and the third switches 100b and 100c are not pressed, may have a signal value of '100'.

In this state, if the bezel portion 11 rotates clockwise, the first switch 100a is separated from the pressing member 11a to then be positioned in the second area (Y) on one side of the pressing member 11a. In addition, the second switch 100b moves toward the pressing member 11a to then be pressed by the pressing member 11a, and the third switch 100c is positioned in the second area (Y) on the other side of pressing member 11a. Thus, the second switch 100b may generate an electric signal of a value "1," while the first and the third switches 100a and 100c do not generate the electric signals to then have a signal value of "0." Accordingly, the state, in which the second switch 100b is pressed, and the first and the third switches are not pressed, may have a signal value of '010'.

In addition, if the bezel portion 11 further rotates clockwise, the first switch 100a moves in the counterclockwise direction of the second area (Y), and the second switch 100b is separated from the pressing member 11a to then be positioned in the second area (Y), where the first switch 100a has been positioned, on one side of the pressing member 11a. In addition, the third switch 100c moves toward the pressing member 11a to then be pressed by the pressing member 11a. Thus, the third switch 100c may generate an electric signal of a value "1," while the first and the second switches 100a and 100b do not generate the electric signals to then have a signal value of "0." Accordingly, the state, in which the third switch 100c is pressed, and the first and the second switches are not pressed, may have a signal value of '001'.

The signal values of '100', '010', and '001', which are generated according to the clockwise rotation of the bezel portion 11, are provided to the control unit 15 in sequence. The control unit 15 may receive the signal values in order to detect that the bezel portion 11 is rotated in a clockwise direction. In addition, the physical user interface may be executed according to the clockwise rotation of the bezel portion 11 and the electric signal values of the first, the second, and the third switches 100a, 100b, and 100c. For example, if the signal value of "100" is provided to the control unit 15, the control unit 15 may display a menu bar for executing (e.g., launching) various applications. In addition, when the signal values of '010' and '001' are provided to the control unit 15, the control unit 15 may execute applications (for example, at least one of a camera function, a speaker function, a body measurement function, a video function, an mp3 function, or the like) that correspond to the unique values.

The operation of recognizing the counterclockwise rotation of the bezel portion 11 will be described further below with reference to FIG. 10 or FIG. 11.

When the first switch 100a engages with the pressing member 11a and the second and third switches remain in the second area (Y) according to the rotation of the bezel portion 11, the first switch 100a may generate an electric signal of a value "1," while the second and third switches 100b and 100c do not generate the electric signals to then have a signal value of "0." Accordingly, the state, in which the first switch 100a is pressed, and the second and the third switches 100b and 100c are not pressed, may have a signal value of '100'.

In this state, if the bezel portion 11 rotates counterclockwise, the first switch 100a moves in the counterclockwise direction of the second area (Y), and the second switch 100b is separated from the pressing member 11a to then be positioned in the second area (Y), where the first switch 100a has been positioned, on one side of the pressing member 11a. In addition, the third switch 100c moves toward the pressing member 11a to then be pressed by the pressing member 11a. Thus, the third switch 100c may generate an electric signal of a value "1," while the first and the second switches 100a and 100b do not generate the electric signals to then have a signal value of "0." Accordingly, the state, in which the third switch 100c is pressed, and the first and the second switches are not pressed, may have a signal value of '001'.

In addition, if the bezel portion 11 further rotates counterclockwise, the first switch 100a is separated from the pressing member 11a to then be positioned in the second area (Y) on one side of the pressing member 11a. In addition, the second switch 100b moves toward the pressing member 11a to then be pressed by the pressing member 11a, and the third switch 100c is positioned in the second area (Y) on the other side of pressing member 11a. Thus, the second switch 100b may generate an electric signal of a value "1," while the first and the third switches 100a and 100c do not generate the electric signals to then have a signal value of "0." Accordingly, the state, in which the second switch 100b is pressed, and the first and the third switches are not pressed, may have a signal value of '010'. The signal values of '100', '001', and '010', which are generated according to the counterclockwise rotation of the bezel portion 11, are provided to the control unit 15 in sequence. The control unit 15 may receive the signal values in order to detect that the bezel portion 11 is rotated in a counterclockwise direction. In addition, a particular user interface may be executed (e.g., displayed) according to the counterclockwise rotation of the bezel portion 11 and the electric signal values of the first, the second, and the third switches 100a, 100b, and 100c. As described above, for example, if the signal value of "100" is provided to the control unit 15, the control unit 15 may display a menu bar for executing (e.g., launching) various applications. In addition, when the signal values of '010' and '001' are provided to the control unit 15 by the rotary input device, the control unit 15 may execute applications (for example, at least one of a camera function, a speaker function, a biometric function, a video function, an mp3 function, or the like) that correspond to the different signal values. When any of the applications is executed, the user interface of that application may be displayed on the display unit of the electronic device.

For example, the control unit 15 may perform one of a plurality of operations based on the type of one or more signals received from the rotary input device and/or the sequence in which the signals are received. For example, when the rotary input device is rotated in clockwise direction, the controller 15 may output a first one of a plurality of user interfaces 17, and when the rotary input device is rotated in a counterclockwise direction, the controller 15 may output a second one of the user interfaces 17.

Figure 12A:
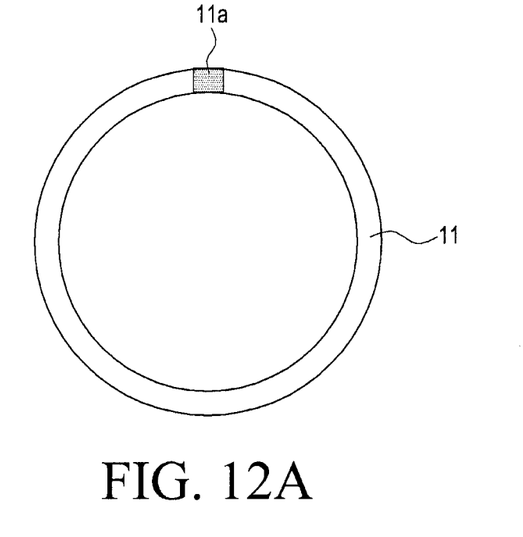
FIG. 12A is a diagram of an example of a bezel portion of a rotary input device, according to various embodiments of the present disclosure.
Figure 12B:
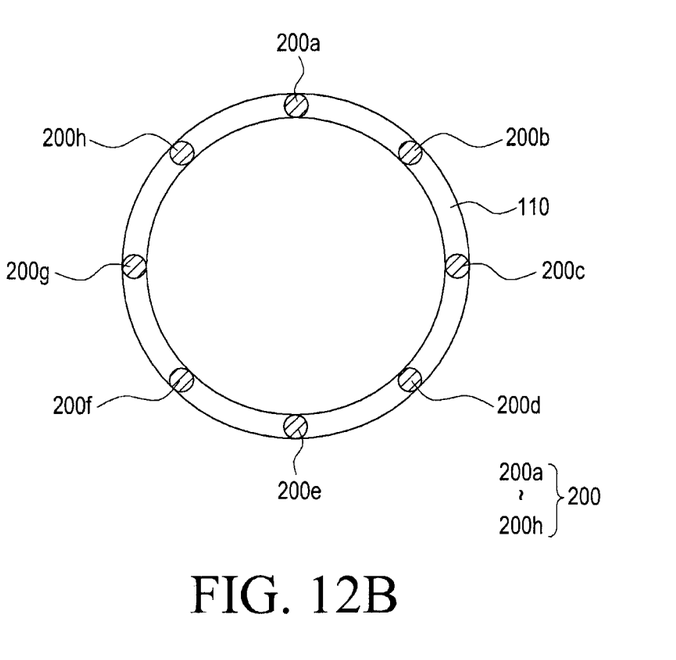
FIG. 12B is a diagram of an example a switch unit of a rotary input device, according to various embodiments of the present disclosure.
Figure 13:
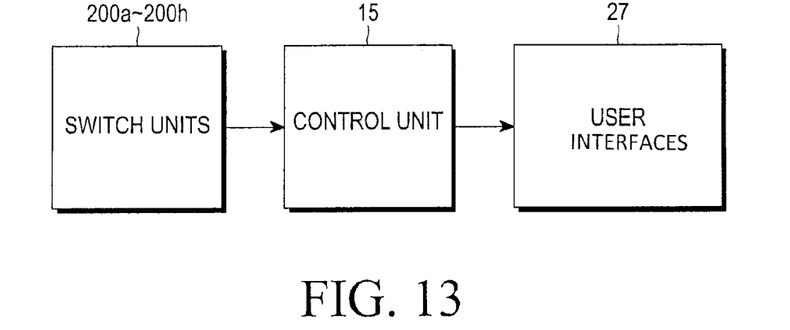
FIG. 13 is a diagram illustrating the operation of an electronic device including the rotary input device of FIGS. 12A-B, according to various embodiments of the present disclosure.

FIG. 12A is a diagram of an example of a bezel portion of a rotary input device, according to various embodiments of the present disclosure. FIG. 12B is a diagram of an example a switch unit of a rotary input device, according to various embodiments of the present disclosure. FIG. 13 is a diagram illustrating the operation of an electronic device including the rotary input device of FIGS. 12A-B, according to various embodiments of the present disclosure.

First, with regard to the description of the present disclosure, the same configuration or operation, which has been described above, may refer to the corresponding description thereof. Hereinafter, the configuration or operation, which is different from that of the description above, will be described further below.

Referring to FIG. 12 and FIG. 13, according to an embodiment of the present disclosure, a single pressing member 11a may be mounted on the inner surface of the bezel portion 11 to protrude downwards (toward the switch unit) from the inner surface of the bezel portion 11. A plurality of pressing members 11a may be provided on the inner surface of the bezel portion 11 to protrude and to be spaced a predetermined distance from each other.

The pressing member 11a may press at least one of the plurality of switch units 200, which are provided inside the body of the electronic device, according to the rotation of the bezel portion 11.

In one embodiment of the present disclosure, the pressing member 11a may protrude from the inner surface of the bezel portion 11, and a groove 11b may be inwardly formed on the protruded surface (e.g., on the surface of the first area (X)) in order to accept the ball 131 of the switch unit 200 as shown in FIG. 6. When the bezel portion 11 is rotated, neighboring switches described below may be pressed by the pressing member in sequence. In addition, as described above, when the groove 11b is formed on the surface of the pressing member 11a, the ball 131 of the switch unit 200 is accepted by the corresponding groove 11b in order to provide the user with tactile feedback.

A plurality of switch units 200, according to an embodiment of the present disclosure, may be mounted adjacently to each other. The plurality of switch units 200 may be spaced a predetermined distance from each other in order to detect the rotation of the bezel portion 11 and in order to execute a particular user interface according to the value of the detected electric signal. The switch units 200, according to an embodiment of the present disclosure, may be associated with different user interfaces, respectively, so that the user interface, which is associated with the switch unit that is pressed by the pressing member 11a, may be displayed by the electronic device. In addition, since the plurality of switch units 200 are provided to be adjacent to each other, the rotational direction of the bezel portion 11 may be recognized according to the order in which the switch units 200 are pressed by the pressing member 11a.

More specifically, the description will be made of the switch units 200 that adopt the first to the eighth switch units 200a to 200h that are mounted around the circumference of the body of the electronic device.

As described above, the rotational direction of the bezel portion 11 may be recognized according to the order in which the first to the eighth switch units 200a to 200h are pressed by the pressing member 11a. For example, if the pressing member 11a presses the first switch unit 200a, the eighth switch unit 200h, and then the seventh switch unit 200g in sequence based on the position of the first switch unit 200a, the switch units 200a to 200h are pressed in the counterclockwise direction, and thus it may be recognized that the bezel portion 11 rotates counterclockwise. Additionally or alternatively, if the pressing member 11a presses the first switch unit 200a, the second switch unit 200b, and then the third switch unit 200c in sequence based on the position of the first switch unit 200a, the switch units 200a to 200h are pressed in the clockwise direction, and thus it may be recognized that the bezel portion 11 rotates clockwise. For example, a user interface may be moved (e.g., moved up or down, and/or moved left or right) according to the rotational direction of the bezel portion.

In addition, as mentioned above, each of the switch units 200 may be configured to correspond to a different one of the user interfaces 27, respectively. When at least one of the switch units 200 is pressed by the pressing member 11a as a result of the rotation of the bezel portion 11, at least one of the pressed switch units 200 may cause the controller 15 to perform a function corresponding to that switch unit. For example, the function may include displaying a specific one of the plurality of user interfaces 27 that corresponds to the given switch unit.

For example, each of the first to the eighth switch units 200a to 200h may be configured with various associated with a different one of a plurality of user interfaces 27. The plurality of user interfaces 27 may be related to the display of menus, the execution of multimedia applications (such as camera, photo, or music applications), detection of biometric information, or the like. For example, when the switch unit 200c is pressed as a result of the rotation of the bezel 11, a menu corresponding to the switch unit 200c may be displayed on the screen by the control unit 15.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. A rotary input device comprising:
   a bezel portion that includes two or more pressing members; and
   one or more switch units, wherein each of the switch units is arranged to come in physical contact with any of the pressing members when the bezel portion is rotated, and generate an electrical on/off signal when the switch unit comes in physical contact with any of the pressing members, wherein, the switch units comprises:
a housing;
a pin portion that is provided in the housing; and
a ball unit that is positioned above the pin portion.

2. The rotary input device of claim 1, wherein any of the switch units comprises:
a shielding unit that is disposed between the ball unit and the housing, the shielding unit being arranged to press the pin portion when the switch unit comes in physical contact with any of the pressing members, and seal a gap between the housing and the ball unit.

3. The rotary input device of claim 2, wherein the pin portion includes at least two pins that are arranged to be electrically connected or disconnected when the pin portion is pressed.

4. The rotary input device of claim 2, wherein the ball unit comprises:
a ball arranged to come into contact with the pressing member; and
a ball housing arranged to receive the ball.

5. The rotary input device of claim 4, wherein the shielding unit comprises:
a sealing plate disposed between the housing and the ball housing; and
a pressing portion that is provided in the sealing plate, and is arranged to extend towards the pin portion.

6. The rotary input device of claim 5, wherein the shielding unit is made of at least one of silicone, urethane, or rubber.

7. The rotary input device of claim 2, wherein the two or more pressing members are disposed on an inner surface of the bezel portion, and are spaced apart from one another.

8. The rotary input device of claim 7, wherein:
at least one of the switch units comprises a first switch, a second switch that is disposed adjacently to the first switch, and a third switch that is disposed adjacently to the second switch, and
the first switch, the second switch, and the third switch are pressed one at a time by a given pressing member, when the given pressing member passes across the switch unit as the bezel portion is rotated.

9. The rotary input device of claim 8, wherein:
the first switch, the second switch, and the third switch are pressed in a first sequence when the bezel portion is rotated in a clockwise direction, and
the first switch, the second switch, and the third switch are pressed in a second sequence when the bezel portion is rotated in a counterclockwise direction.

10. The rotary input device of claim 2, wherein the ball unit is arranged to open or close the pin portion, when the ball unit is pressed as a result of coming in physical contact with the pressing member.

11. The rotary input device of claim 1 further comprising a housing, wherein the one or more switch units are disposed adjacently to each other along an edge of the housing.

12. The rotary input device of claim 11, wherein each of the switch units is configured to generate a different sequence of signals according to a direction in which the bezel portion is rotated.

13. The rotary input device of claim 1, wherein a rotational direction of the bezel portion is indicated by an order in which the switch units are pressed when the bezel portion is rotated.

14. An electronic device comprising the rotary input device of claim 1.

15. The electronic device of claim 14, further comprising:
a display unit; and
at least one processor operatively coupled to the rotary input device, configured to:
display a first interface on the display unit in response to a first signal from the rotary input device; and
display a second interface on the display unit in response to a second signal from the rotary input device.

* * * * *